P. LEVY.
PROCESS AND APPARATUS FOR THE MANUFACTURE OF TUBES.
APPLICATION FILED NOV. 1, 1918.

1,325,301.

Patented Dec. 16, 1919.

Inventor.
Paul Levy

UNITED STATES PATENT OFFICE.

PAUL LEVY, OF PARIS, FRANCE, ASSIGNOR TO SOCIETE ANONYME DES TREFILERIES ET LAMINOIRS DU HAVRE, ANCIENS ETABLISSEMENTS LAZARE WEILLER, SOCIETE COOPERATIVE DE RUGLES ET LA CANALISATION ELECTRIQUE REUNIS, OF PARIS, FRANCE, A CORPORATION OF FRANCE.

PROCESS AND APPARATUS FOR THE MANUFACTURE OF TUBES.

1,325,301.   Specification of Letters Patent.   Patented Dec. 16, 1919.

Application filed November 1, 1918. Serial No. 260,632.

*To all whom it may concern:*

Be it known that I, PAUL LEVY, engineer of 32 Rue Lévis at Paris, Department of the Seine, in France, citizen of the French Republic, have invented certain new and useful Improvements in Processes and Apparatus for the Manufacture of Tubes; and I do hereby declare the following to be a full, clear, and exact description of the invention, such as will enable others skilled in the art to which it appertains to make and use the same.

This invention has for its object a process and apparatus for the manufacture of tubes direct and in a heated state without soldering and either profiled or not.

The process consists principally in giving to the material at the point where the tube is to be formed, at the same time that it is given a forward movement, a movement of rotation produced by helicoidal projections and grooves either on the drawplate or the funnel or the rod which forms the interior of the tube and is integral with the pusher piston, which helicoidal formation may be on one, two or all three parts at once.

The invention is described in detail with reference to the accompanying drawing which represents by way of example and diagrammatically, the mechanism for carrying out the process.

Figure 1:
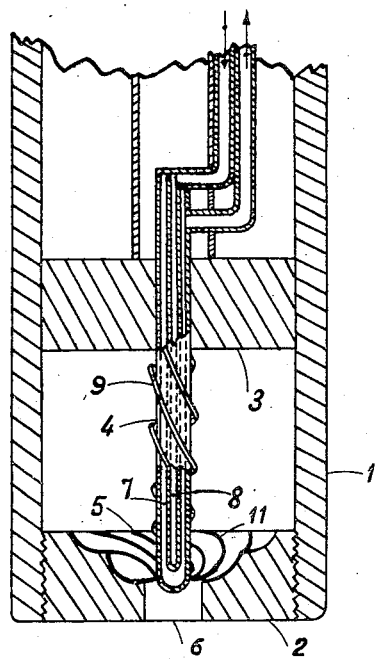
Figure 1 shows in vertical section the compressing cylinder with a central rod and a funnel with helicoidal grooves.

The process described permits of the manufacture of tubes of all dimensions down to the smallest thicknesses direct and in a heated state without soldering.

The invention may be carried out with all metals and alloys as well as with all plastic materials or those which can be molded.

As has been said, the process consists in driving the metal, (or the material) brought to a certain temperature, into a container or cylinder 1, terminating in a matrix 2, by means of a piston 3 having at its center the rod 4 which is to determine the internal diameter of the tube.

The temperature is variable according to the metals or alloys or materials; for pure aluminium it is between 450 to 500 degrees C.; for brass 60/40 it is approximately between 600 and 700 degrees.

In the present process the rod 4, contrary to that which exists in apparatus of this kind, is rigid with the compressing piston and moves forward with it.

In order to produce the best results, it is recommended to use a hot blank having externally the internal form of the compressor, a cylinder for example and if necessary to pierce this cylinder at the front with a central hole which will receive the rod without effort, although, starting from a certain diameter of the rod this latter may itself perform the operation of piercing at the commencement of the compressing operation.

The rod is of a length which is slightly greater than that of the blank which it is desired to compress, so as to be already engaged in the matrix when the compressing operation commences.

It will be understood that the compression can be carried out by any means, as by a screw, hydraulically, etc.

The smallest thicknesses are obtained by reason of the fact that the entrance to the matrix 2, on the side of the container, is hollowed out in the forms of a funnel 5 with helicoidal projections 11 and the tube proceeds to form itself as much by a rotary movement of the material, which is imparted by the helicoidal funnel 5, as by the longitudinal driving movement of the piston 3. The matrix may also be made in two removable pieces, one for the funnel and the other for the drawplate and only occupy any part of the base of the container, one of which may receive several matrices.

Figure 2:
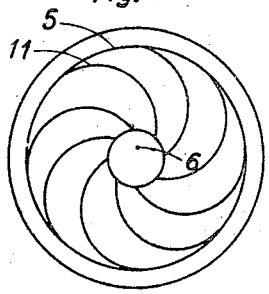
Fig. 2 is a plan view of the funnel and of the drawplate of Fig. 1.

The rod 4 may be hollow at 7 and be cooled by a circulation of air or water supplied by a pipe 8, or in any other way. Instead of being cylindrical, the rod may affect a form with a helicoidal surface 9 which permits tubes with internal wings or ribs to be obtained. (See Figs. 1 and 2).

Figure 3:
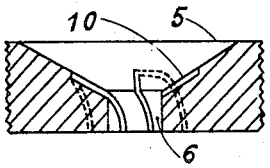
Figs. 3 and 4 are sectional and plan views of a modification of the funnel and the drawplate.
Figure 4:
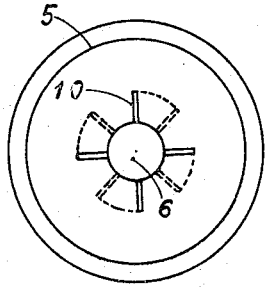

In order to obtain tubes with external wings or ribs the matrix 2 is made with a circular drawplate 6 having grooves or slots 10 of helicoidal form, or oblique ones and the conical funnel 5 may remain smooth. (See Figs. 3 and 4).

It will be understood that the profile of the tubes may be of any kind and that according to the possibilities of working and requirements the helicoidal surface which produces the rotary movement of the material may be formed either on the drawplate or on the funnel, or on the central rod forming the interior of the tube or may be separately on one, two or all three of these parts at once.

I claim:

1. The method of forming tubes from metal, which consists in forcing the metal through an annular elongated passageway and imparting a helicoidal movement to the metal prior to its entrance into said passageway.

2. An apparatus for forming tubes from metal, which comprises a cylinder, a draw plate at one end thereof having a cylindrical opening therethrough and a helicoidal funnel leading to the opening from the interior of the cylinder, a piston operable in the cylinder, and a rod carried by the piston and adapted to be projected into the opening in the draw plate upon the movement of the piston toward said draw plate.

3. An apparatus for forming tubes, a hollow cylinder having a draw plate mounted stationary at one end thereof, said draw plate having a central passageway therein, and a helicoidal funnel leading to said passageway from the interior of the cylinder, a piston movable in the cylinder and a rod carried by the piston and adapted to pass through said passageway.

In testimony whereof I affix my signature.

PAUL LEVY.